United States Patent
Elbe et al.

(10) Patent No.: US 7,016,927 B2
(45) Date of Patent: Mar. 21, 2006

(54) METHOD AND APPARATUS FOR MODULAR MULTIPLICATION

(75) Inventors: Astrid Elbe, Munich (DE); Norbert Janssen, Munich (DE); Holger Sedlak, Sauerlach (DE); Jean-Pierre Seifert, Munich (DE)

(73) Assignee: Infineon Technologies AG, Munich (DE)

( * ) Notice: Subject to any disclaimer, the term of this patent is extended or adjusted under 35 U.S.C. 154(b) by 45 days.

(21) Appl. No.: 10/789,462

(22) Filed: Feb. 26, 2004

(65) Prior Publication Data

US 2004/0210613 A1    Oct. 21, 2004

Related U.S. Application Data

(63) Continuation of application No. PCT/EP02/09404, filed on Aug. 22, 2002.

(30) Foreign Application Priority Data

Aug. 29, 2001 (DE) ................................. 101 42 155

(51) Int. Cl.
*G06F 7/72*    (2006.01)
(52) U.S. Cl. ..................................... 708/491
(58) Field of Classification Search ............... 708/491, 708/492

See application file for complete search history.

(56) References Cited

U.S. PATENT DOCUMENTS 4,870,681 A * 9/1989 Sedlak ......................... 380/30
5,349,551 A 9/1994 Petro 2001/0010077 A1 * 7/2001 McGregor et al. .......... 713/174
2002/0152252 A1 * 10/2002 Kaminaga et al. ........... 708/491
2002/0161810 A1 * 10/2002 Mellott et al. ............... 708/491

FOREIGN PATENT DOCUMENTS

DE    36 31 992 A1    11/1987

OTHER PUBLICATIONS

Walter, Colin D.;"Faster Modular Multiplication by Operand Scaling"; Advances in Cryptology, Santa Barbara, CA., Aug. 11-15, 1991, Proceedings of the Conference On Theory and Applications of Cryptographic Techniques (CRYPTO), Berlin, Springer, Germany, 1991, pp. 313-323.

(Continued)

*Primary Examiner*—D. H. Malzahn
(74) *Attorney, Agent, or Firm*—Darby & Darby (57) ABSTRACT

In a method for modular multiplication of a multiplicand by a multiplier using a modulus, l multiplication shift values are initially determined by means of a multiplication-lookahead method while taking into account l blocks of consecutive digits of the multiplier. Subsequently, l reduction shift values are determined by means of a reduction-lookahead method for the l blocks of digits of the multiplier. The l multiplication shift values and the l reduction shift values are applied to an intermediate result from a previous iteration step, to the modulus or to a value derived from the modulus, and to the multiplicand, so as to obtain the 2l+1 operands. By means of a multi-operands adder, the 2l+1 operands are combined to obtain an updated intermediate result for an iteration step following the previous iteration step, the iteration being continued for such time until all digits of the multiplier have been processed. Depending on the number of operands, the number of cycles to be calculated is reduced, so that faster calculation of the modular multiplication is possible at the expense of higher hardware expenditure.

11 Claims, 7 Drawing Sheets

OTHER PUBLICATIONS

Walter, Colin D.;"Space/Time Trade-Offs for Higher Radix Modular Multiplication Using Repeated Addition"; IEEE Transactions on Computers, IEEE Inc., New York, US, Bd. 46, Nr. 2, Feb. 1, 1997, pp. 139-141.

Dhem, Jean-Francois;"Design of an efficient public-key cryptographic library for RISC-based smart cards"; These Soutenue en vue de L'Obtention du Grade de Docteur en Sciences Appliquees, May 1998, pp. 11-56.

* cited by examiner

FIG 5 (MODULUS)

FIG 6 (TRANSFORMED MODULUS)

FIG 7 ($\tfrac{2}{3}N^T$)

METHOD AND APPARATUS FOR MODULAR MULTIPLICATION

CROSS-REFERENCE TO RELATED APPLICATIONS

This application is a continuation of copending International Application No. PCT/EP02/09404, filed Aug. 22, 2002, which designated the United States and was not published in English.

BACKGROUND OF THE INVENTION

1. Field of the Invention

The present invention relates to a method and an apparatus for modular multiplication of a multiplicand by a multiplier using a modulus, and, in particular, to modular multiplication using a multiplication-lookahead method and a reduction-lookahead method.

2. Description of Prior Art

Cryptography is one of the major applications for modular arithmetic. An essential algorithm for cryptography is the known RSA algorithm. The RSA algorithm is based on a modular exponentiation which may be represented as follows:

$$C = M^d \bmod(N).$$

Here, C is an encrypted message, M is a non-encrypted message, d is the secret key, and N is the modulus. The modulus N is usually created by multiplying two prime numbers p and q. The modular exponentiation is split into multiplications by means of the known square-and-multiply algorithm. To this end, the exponent d is split into powers of two, so that the modular exponentiation may be split into several modular multiplications. In order to be able to implement the modular exponentiation efficiently in terms of computation, the modular exponentiation is therefore split into modular multiplications, which may then be split into modular additions.

Figure 8:
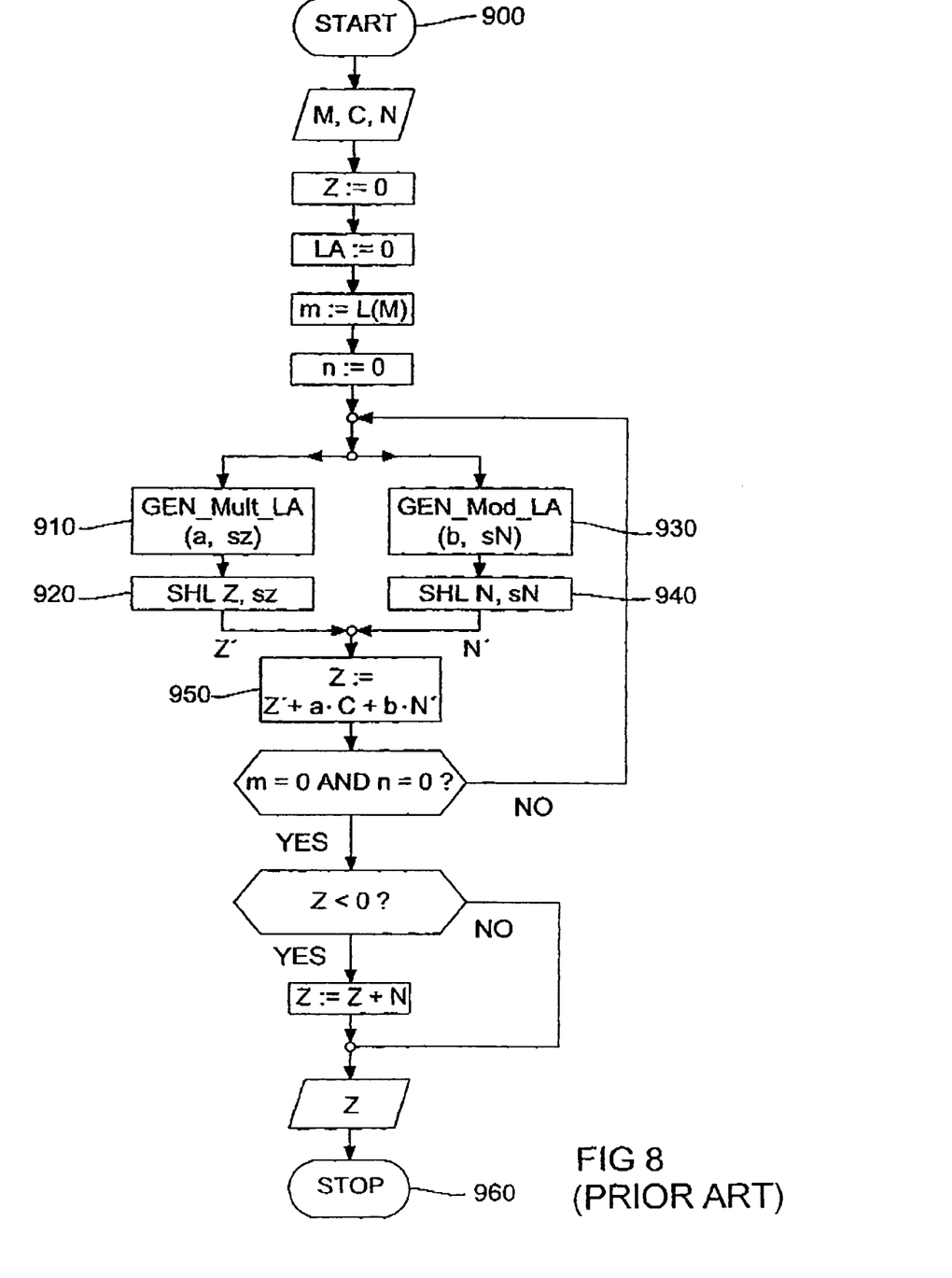
FIG. 8 is a flow-chart representation of the prior art ZDN method.

DE 3631992 discloses a cryptography method wherein modular multiplication may be accelerated using a multiplication-lookahead method and using a reduction-lookahead method. The method described in DE 3631992 C2 is also referred to as a ZDN method and will be described in more detail with regard to FIG. 8. After a starting step 900 of the algorithm, the global variables M, C and N are initialized. The aim is to calculate the following modular multiplication:

$$Z = M*C \bmod N.$$

M is referred to as the multiplier, where C is referred to as the multiplicand. Z is the result of the modular multiplication, whereas N is the modulus.

Hereupon, different local variables are initialized, which need not be explained in further detail. Subsequently, two lookahead methods are applied. In the multiplication-lookahead method GEN_MULT_LA, a multiplication shift value $s_Z$ as well as a multiplication-lookahead parameter a are calculated using different lookahead rules (910). Hereupon, the current content of the Z register is subjected to a left-shift operation by $s_Z$ digits (920).

Essentially in parallel therewith, a reduction-lookahead method GEN_Mod_LA (930) is performed to calculate a reduction shift value $s_N$ and a reduction parameter b. In step 940, the current content of the modulus register, i.e. N, is shifted to the left and right, respectively, by $s_N$ digits so as to create a shifted modulus value N'. The central three-operands operation of the ZDN method takes place in step 950. Here, the intermediate result Z' is added, after step 920, to multiplicand C, which is multiplied by the multiplication-lookahead parameter a, and to the shifted modulus N', which is multiplied by the reduction-lookahead parameter b. Depending on the current situation, the lookahead parameters a and b may have a value of +1, 0 or −1.

A typical case is for the multiplication-lookahead parameter a to be +1, and for the reduction-lookahead parameter b to be −1, so that the multiplicand C is added to a shifted intermediate result Z', and so that the shifted modulus N' is subtracted therefrom. a will have a value equal to 0 if the multiplication-lookahead method allows more than a preset number of individual left shifts, i.e. if $s_Z$ is larger than the maximum admissible value of $s_Z$, which is also referred to as k. In the event that a equals 0 and that Z' is still fairly small due to the preceding modular reduction, i.e. to the preceding subtraction of the shifted modulus, and that Z' is, in particular, smaller than the shifted modulus N', no reduction need take place, so that parameter b equals 0.

Steps 910 to 950 are performed for such time until all digits of the multiplicand have been processed i.e. until m equals 0, and until a parameter n also equals 0, which parameter indicates whether the shifted modulus N' is even larger than the original modulus N, or whether further reduction steps must be performed by subtracting the modulus from Z despite the fact that all digits of the multiplicand have already been processed.

Eventually it will also be determined whether Z is smaller than 0. If this is so, modulus N must be added to Z so as to achieve a final reduction, so that eventually the correct result Z of the modular multiplication is obtained.

In a step 960, the modular multiplication by means of the ZDN method is terminated.

The multiplication shift value $s_Z$ as well as the multiplication parameter a, which are calculated by means of the multiplication-lookahead algorithm in step 910, result from the topology of the multiplier as well as from the lookahead rules used which are described in DE 3631992 C2.

The reduction shift value $s_N$ and the reduction parameter b are determined, as is also described in DE 3631992 C2, by comparing the current content of the Z register with a value ⅔×N. The name of the ZDN method is based on this comparison (ZDN=Zwei Drittel N=two thirds of N).

The ZDN method, as is depicted in FIG. 8, traces the modular multiplication back to a three-operands addition (block 950 in FIG. 8), wherein the multiplication-lookahead method and, hand in hand therewith, the reduction-lookahead method, are used for increasing the calculating-time efficiency.

The reduction-lookahead method, which is performed in block 930 of FIG. 9, will be explained below in more detail with reference to FIG. 8. Initially, in a block 1000, a reservation for the local variables, i.e. for the reduction-lookahead parameter b and the reduction shift value $s_N$, is performed. In a block 1010, the reduction shift value $s_N$ is initialized to zero. Hereupon, the value ZDN, which equals ⅔ of modulus N, is calculated in a block 1020. This value which is determined in block 1020 is stored on the crypto-coprocessor on a register of its own, i.e. the ZDN register.

It is then determined, in a block 1030, whether the variable n equals 0, or whether the shift value $s_N$ equals −k. k is a value defining the maximum shift value specified by the hardware. In the first run, block 1030 is answered by NO, so that in a block 1040, parameter n is decremented, and so that in a block 1060, the reduction shift value is also decremented by 1. Then, in a block 1080, the variable ZDN is redefined, i.e. is defined as half its value, which may readily be achieved by a right-shift of the value found in the ZDN register. It is then established, in a block 1100, whether the absolute value of the current intermediate result is higher than the value found in the ZDN register.

This comparative operation performed in block 1100 is the central operation of the reduction-lookahead method. If the question is answered with YES, the iteration is terminated, and the reduction-lookahead parameter is defined, as is represented in block 1120. If, however, the question to be answered in block 1100 is answered with NO, an iterative backward jump is performed to examine the current values of n and $s_N$ in block 1030. If block 1030 is answered with YES at some point in the iteration, the process jumps to a block 1140, wherein the reduction parameter b is set to zero. In the three-operands operation represented in block 950 in FIG. 8, the result is that no modulus is added or subtracted, which means that the intermediate result of Z was so small that no modular reduction was necessary. In a block 1160, the variable n is then redefined, the reduction shift value $s_N$ being eventually calculated in a block 1180, which reduction shift value $s_N$ is needed, in a block 940 of FIG. 8, to perform the left shift of the modulus so as to achieve a shifted modulus.

In blocks 1200, 1220 and 1240, the current values of n and k are finally examined for further variables MAX and cur_k so as to examine the current definition of the N register to ensure that no register overshoot takes place. The further details are not relevant to the present invention but are described more fully in DE 3631992 C2.

The ZDN algorithm essentially consists of the following steps:
1. Calculating the multiplication shift value $s_Z$ and the multiplication-lookahead parameter a.
2. Shifting the content of the z register by $s_Z$ digits, i.e. multiplying the intermediate result of the previous iteration step by a factor of $2^{s_Z}$.
3. Calculating the reduction shift value $s_N$ and, optionally, the reduction-lookahead parameter b.
4. Shifting the content of the N register by $s_N$ digits, i.e. multiplying the current modulus by a factor of $2^{s_N}$.
5. Performing the three-operands addition to obtain an updated intermediate result Z in accordance with the following defining equation $2^{s_Z} Z + a \, c + b \, 2^{s_N} N$.

Depending on the multiplication-lookahead algorithm, it is necessary to calculate multiplication-lookahead parameters (a) and reduction-lookahead parameters (b). As is known, these parameters may take on values from −1.0 to +1.

Figure 3A:
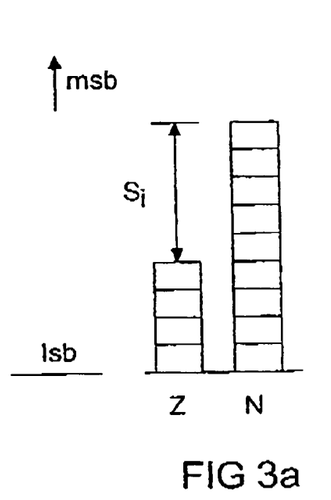
FIGS. 3a to 3c are schematic representations of the connection between the multiplication shift value $s_Z$, the auxiliary shift value $s_i$, and the reduction shift value $s_N$.

Depending on the implementation, the reduction shift value $s_N$ may be calculated using an auxiliary shift value $s_i$, as will be explained with reference to FIGS. 3a to 3c. For calculating the reduction shift parameter $s_N$, in this case, the auxiliary shift value $s_i$, i.e. the difference between the most significant bits of the current Z-register entry and the current modulus-register entry, is initially calculated, whereupon the reduction shift values $s_N$ will be calculated from the difference between the multiplication shift value $s_Z$ and the auxiliary shift value $s_i$.

As is known from DE 3631992 C2, the time required to calculate a modular multiplication M C mod N is proportional to a third of the length of the multiplier M in terms of bits. This means that the number of cycles needed for calculating the modular multiplication equals L(M)/3.

Even though a substantial acceleration of the modular multiplication may be achieved using the multiplication-lookahead method and the reduction-lookahead method conducted in parallel, there is still a desire to accelerate modular multiplication even more, which becomes more important especially if the length of the multiplier is ever-increasing, in terms of bits, which may lead to improved security of the algorithm, especially in the RSA algorithm.

In addition, rapid calculation of modular multiplication is important not only, for example, with chip cards, where the level of acceptance of an encryption concept is also dependent on the amount of time a user must wait, but it is also important in so-called trusted centers, where, e.g., 1000 RSA encryptions are to be performed per second. Such trusted centers can be found wherever a security server has to serve a plurality of client queries.

SUMMARY OF THE INVENTION

It is the object of the present invention to provide a faster method and a faster apparatus for modular multiplication.

In accordance with a first aspect, the invention provides a method for performing a modular multiplication on data processing means between a multiplicand and a multiplier consisting of a plurality of digits, using a modulus, the modular multiplication being part of a modular exponentiation within the framework of a cryptographic application, and the multiplicand, the multiplier and the modulus being variables of the cryptographic application, the method having of the following steps: determining l multiplication shift values by means of a multiplication-lookahead method while taking into account l blocks of consecutive digits of the multiplier, l being larger or smaller than 2; determining l reduction shift values by means of a reduction-lookahead method for the l blocks of digits of the multiplier; applying the l multiplication shift values and the l reduction shift values to an intermediate result from a previous iteration step, to the modulus or to a value derived from the modulus, and to the multiplicand so as to obtain 2l+1 operands; and combining the operands to obtain an updated intermediate result for an iteration step following the previous iteration step, an iteration being continued for such time until all digits of the multiplier have been processed, wherein the updated intermediate result, once all digits of the multiplier have been processed, is a result of the modular exponentiation within the framework of the cryptographic application.

In accordance with a second aspect, the invention provides an apparatus for performing a modular multiplication on data processing means between a multiplicand and a multiplier consisting of a plurality of digits, using a modulus, the modular multiplication being part of a modular exponentiation within the framework of a cryptographic application, and the multiplicand, the multiplier and the modulus being variables of the cryptographic application, the apparatus having: means for determining l multiplication shift values by means of a multiplication-lookahead method while taking into account l blocks of consecutive digits of the multiplier, l being larger or smaller than 2; means for determining l reduction shift values by means of a reduction-lookahead method for the l blocks of digits of the multiplier; means for applying the l multiplication shift values and the l reduction shift values to an intermediate result from a previous iteration step, to the modulus or to a value derived from the modulus, and to the multiplicand so as to obtain 2l+1 operands; and means for combining the operands to obtain an updated intermediate result for an iteration step following the previous iteration step, an iteration being continued for such time until all digits of the multiplier have been processed, wherein the updated intermediate result, once all digits of the multiplier have been processed, is a result of the modular exponentiation within the framework of the cryptographic application.

The present invention is based on the findings that the number of cycles needed for calculating modular multiplication may be reduced if a multi-operands adder suited for five, seven or even more operands is used instead of a three-operands adder as has been used in the prior art. Contrary to the conventional ZDN method, wherein one iteration step is performed after another, in the present invention, two, three or more iteration steps are performed at the same time. Instead of a three-operands adder, as in the prior art, a five-, seven- or an even more significant operands adder is required for this purpose, which adder is fed, as operands, not only the latest intermediate result Z, the multiplicand C and the modulus, but, depending on the implementation—i.e. whether it is a five-operands adder, a seven-operands adder or an even more significant adder—but is also fed a shifted intermediate result, a multiplicand and a shifted multiplicand as well as a modulus shifted by two different shift values, etc. The manner in which something is applied to the intermediate result from the previous iteration step, to the modulus or a value derived from the modulus, and to multiplicand C using the multiplication shift values and the reduction shift values, respectively, depends on the ZDN defining equation. The application values result when the equation for the updated intermediate result from the previous step is introduced in the ZDN equation so as to calculate, using the inventive adder for five, seven or even more operands, the updated intermediate result Z for the next ZDN step, the ZDN step after that, the ZDN step even after that or for an even higher conventional ZDN step.

For this purpose, two or more multiplication shift values $s_Z^1$ to $s_Z^l$ are determined using a multiplication-lookahead method while taking into account l blocks of consecutive digits of the multiplier. In addition, l reduction shift values $s_N^1$ to $s_N^l$ are calculated using a reduction-lookahead method, to be precise for the same l blocks of digits of the multiplier.

The l multiplication shift values and the l reduction shift values are applied to the intermediate result Z from a previous iteration step, to the modulus or to a value derived from the modulus, and to the multiplicand so as to obtain the 2l+1 operands, which are then combined by means of the (2l+1)-operands adder so as to obtain an updated intermediate result for an iteration step following the previous iteration step, the iteration being continued for such time until all digits of the multiplier have been processed.

If use is made of a multiplication-lookahead method, wherein the multiplication shift values for the l blocks of consecutive digits of the multiplier are independent of each other, it is readily possible to calculate several multiplication shift values in advance.

Typically, the l reduction shift values $s_N^1$ to $s_N^l$ depend on previous reduction shift values and previous multiplication shift values. Thus, the first reduction shift value $s_N^1$ depends on the first multiplication shift value $s_Z^1$ across the auxiliary shift value $s_i^1$. In addition to being dependent on the second multiplication shift value $s_Z^2$ however, the second reduction shift value $s_N^2$ also depends on the sum of the intermediate result Z shifted by $s_Z^1$, of the multiplicand C multiplied by the multiplication-lookahead parameter from the first step $a^1$, and of the modulus N shifted by $s_N^1$, multiplied by the reduction-lookahead parameter $b^1$ from the previous step. For calculating the reduction shift parameter $s_N^2$ and the reduction-lookahead parameter $b^2$, the above-mentioned sum on which these values depend could be determined. For calculating the reduction-lookahead parameter $s_N^2$, however, it is not the total sum that is required, but only the most significant bit of this sum, so as to obtain the correct reduction shift parameter so that a correct reduction takes place in parallel with the multiplication. It is therefore preferred to calculate the sum in terms of an approximation only, which may be accomplished by dispensing with integrating the multiplicands into the sum and by performing a modulus transformation so as to be able to rapidly calculate a few of the most significant bits of the above-mentioned sum.

BRIEF DESCRIPTION OF THE DRAWINGS

Preferred embodiments of the present invention will be explained below in more detail with reference to the accompanying figures, wherein.

DESCRIPTION OF PREFERRED EMBODIMENTS

Figure 1:
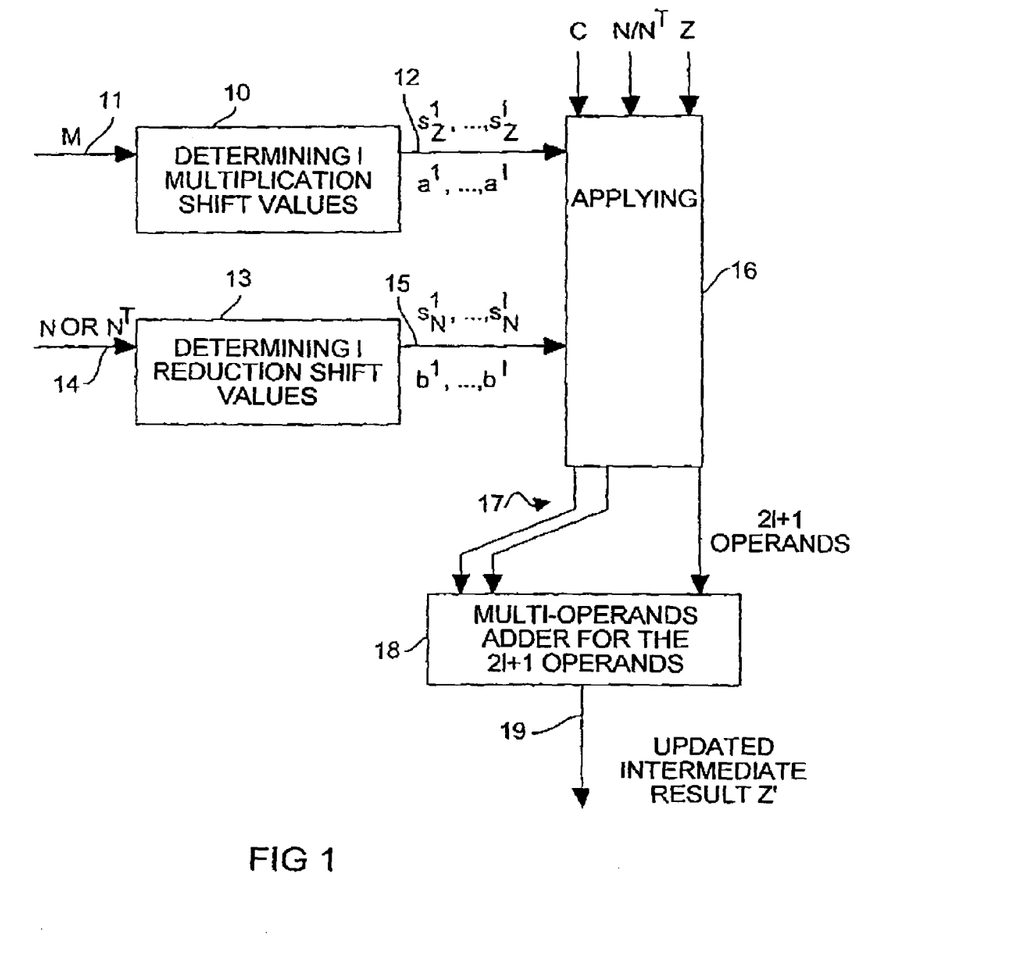
FIG. 1 is a block diagram of an inventive apparatus for modular multiplication by a (2l+1)-operands adder.

FIG. 1 shows a block diagram of an inventive apparatus for modular multiplication of a multiplicand (C) by a multiplier (M), which consists of a plurality of digits, using a modulus (N). The apparatus initially includes means 10 for determining l multiplication shift values. As has been discussed in DE 3631992 C2, for this purpose, the multiplier M, which is fed to means 10 via a multiplier input 11, is scanned. At an output 12, means 10 provide multiplication shift values $s_Z^1, \ldots, s_Z^l$ as well as—if the multiplication-lookahead algorithm disclosed in DE 3631992 C2 is used—multiplication-lookahead parameters $a^1, \ldots, a^l$. A multiplication shift value $s_Z^i$ is associated with a block of digits of multiplier M, the block of digits being determined by the lookahead algorithm used. Thus, for successive l blocks of digits of multiplier M, the variables $s_Z^i$ and $a^i$ listed at output 12 of means 10 are yielded.

In addition, the inventive apparatus includes means 13 for determining l reduction shift values. Means 13 are fed, via a modulus input 14, modulus N or a transformed modulus $N^T$, the transformed modulus $N^T$ being an example of a value derived from modulus N. However, it shall be pointed out that the modulus value N or $N^T$ fed via input 14 is not necessarily the original modulus N or the original transformed modulus $N^T$ of the modular multiplication. This will actually only apply in the first iteration step, i.e. when the first block of digits of multiplier M is "processed". As early as in the second iteration step, the modulus value fed via modulus input 14 is the original modulus shifted by $s_N^i$ or the original transformed modulus $N^T$ shifted by $s_N^i$.

At their output 15, means 13 provide reduction shift parameters $s_N^1$ to $s_N^l$ as well as reduction shift parameters $b^1$ to $b^l$.

Outputs 12 and 15 of means 10 and 13 are fed to means 16 for applying. Means 16 apply something to multiplicand C, to modulus N and/or to the transformed modulus $N^T$ and/or to the corresponding values following an iteration step, as has been explained with regard to input 14, and apply an intermediate result Z of a previous iteration step such that 2l+1 operands 17 are formed which are then combined by means of a multi-operands adder 18 for the 2l+1 operands so as to obtain an updated intermediate result Z'. In a next iteration step, the updated intermediate result Z' again represents the input variable Z input into means 16 for applying.

The iteration is continued for such time until all digits of multiplier M have been processed. The updated intermediate result Z' which will then be obtained at the output 19 of means 18 will then represent the result of the modular multiplication. It shall be pointed out, that, if need be, a reduction may still need to take place using the original modulus N so as to lead the updated intermediate result Z' of the latest iteration step back to the residual class of the original modulus N. If a modulus transformation has been performed, a modulus back-transformation must also take place for calculating the final result of the modular multiplication.

Figure 2:
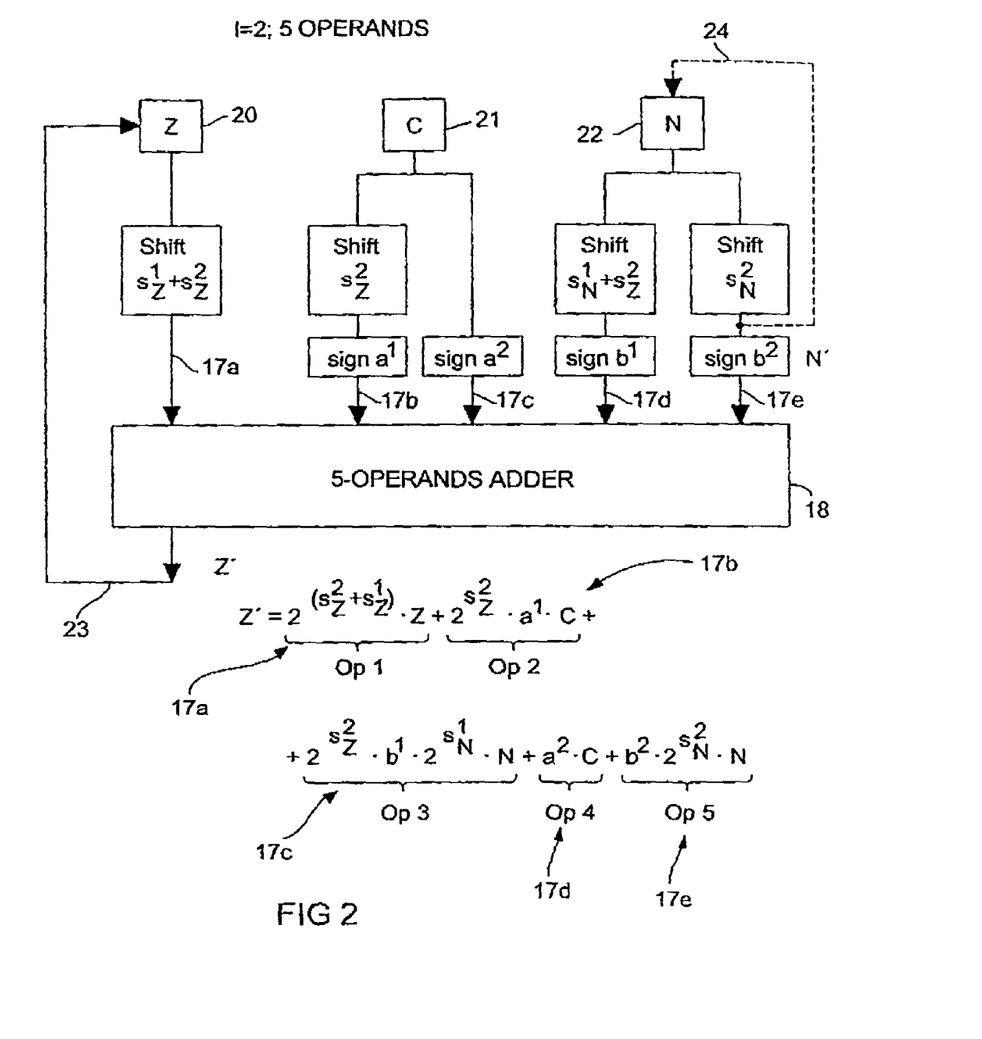
FIG. 2 is a block diagram of an embodiment with a five-operands adder.

Below, reference shall be made to FIG. 2 in order to represent the structure of means 16 for applying, of FIG. 1, for the case that l=2, i.e. for the case of a five-operands adder. Before FIG. 2 is looked at in further detail, it shall be pointed out that multi-operands adders are described in chapter 8 of specialist publication "Computer Arithmetic, Algorithms and Hardware Designs", Bahrooz Parhami, Oxford, ISBN 0-19-512583-5.

The defining equation of the prior art ZDN method using a three-operands adder is as follows:

$$Z' = 2^{s_Z} Z + a\ C + b\ 2^{s_N} N.$$

Z' is the updated intermediate result. Z is the intermediate result of the previous iteration step. $s_Z$ is the multiplication shift value which depends on those digits of the multiplier that have just been looked at. a is the multiplication-lookahead parameter corresponding to the multiplication shift value $s_Z$. b is the reduction-lookahead parameter corresponding to the reduction shift value $s_N$, whereas N represents the content of the modulus register from the preceding iteration step.

In accordance with the invention, the three-operands sum is used as a basis, and a sum of more than three operands is formed to combine two or more (l) steps of the prior art ZDN method into a single iteration step of the inventive method.

This will be represented below using l=2. The equation for the updated intermediate result Z' following an iteration step in accordance with the inventive method is as follows:

$$Z' = 2^{s_Z^2}(2^{s_Z^1} Z + a^1 C + b^1 2^{s_N^1} N) + a^2 C + b^2 2^{s_N^2} N.$$

If this equation is summarized accordingly, the following defining equation results for the updated intermediate result Z':

$$Z' = 2^{(s_Z^2 + s_Z^1)} Z + 2^{s_Z^2} a^1 (C + 2^{s_Z^2} + s_N^1) b^1 N + a^2 C + b^2 2^{s_N^2} N.$$

As is known, the exponents of the base of 2 in the above equation may be obtained by shifting the appropriate register content to the left or to the right by the number of digits given by the exponents. A possible circuit implementation of the above equation is shown in FIG. 2. A first operand 17a is obtained by shifting the register content Z 20 by $s_Z^1 + s_Z^2$ digits. A second operand 17b is obtained by shifting the content of the multiplicand register 21 by $s_Z^2$ digits and applying the sign of the multiplication-lookahead parameter $a^1$ to it. By analogy therewith, a third operand 17c is obtained by applying the sign of the multiplication-lookahead parameter $a^2$ to the content of the multiplicand register 21. A fourth operand 17d is obtained by initially shifting the content of the modulus register 22 by $s_N^1 + s_Z^2$ digits and, in addition, by applying the sign of the reduction-lookahead parameter $b^1$ to it. The last operand 17e for the case that l=2 is obtained by shifting the content of the modulus register 22 by $s_N^2$ digits, and, in addition, by applying the sign of $b^2$ to it. The five operands 17a to 17e are then added up in the five-operands adder 18 to obtain the updated intermediate result Z' for an iteration step of the inventive method.

The updated intermediate result is fed into the Z register 20 via a Z data path 23, so that the Z register 20 is ready for the next iteration step. While multiplicand C is the same in all iteration steps, modulus N', which is shifted by $s_N^2$ digits, is led back into modulus register 22 via a modulus data path 24, so that modulus register 22 is also prepared for the next iteration step.

It shall be pointed out that the shift values $s_Z^i$, $s_N^i$ as well as the parameters $a^i$ and $b^i$ must be calculated in advance, as is indicated by means 10 and 13 of FIG. 1. The same applies if l=3 is chosen instead of l=2. In this case, the defining equation for the updated intermediate result Z' would be as follows:

$$Z' = 2^{s_Z^3} [2^{s_Z^2}(2^{s_Z^1} Z + a^1 C + b^1 2^{s_N^1} N) + a^2 C + b^2 2^{s_N^2} N] + a^3 C + b^3 2^{s_N^3} N.$$

Multiplying and combining the above equation then results in the shift and/or sign values for a seven-operands adder to combine, as it were, three individual steps of the prior art ZDN method into one single iteration step of the inventive ZDN method.

Those skilled in the art are readily able, from the examples given with regard to l=2 and l=3 for calculating the shift values and the sign values, to determine the structure of means 16 for applying, of FIG. 1, for l=4 and figures higher than that, too. It shall be pointed out that as l increases, the expenditure in terms of hardware increases, but, at the same time, the number of cycles to be calculated in accordance with L(M)/(1 3) decreases. It has been found that an optimum compromise between the hardware expenditure on the one hand, and the savings in terms of time, on the other hand, is achieved with a value of l=3, i.e. with a circuit having a seven-operands adder.

Below, reference shall be made to calculating the l multiplication shift values (means 10 of FIG. 1) and/or to calculating l reduction shift values (means 13 of FIG. 1). While the calculation of the multiplication shift values $s_Z^1, \ldots, s_Z^l$, and of the multiplication-lookahead parameters $a^1, \ldots, a^l$ corresponding to the former, is determined by the multiplication-lookahead algorithm used, there are various possibilities of making the calculation of the l reduction shift values $s_N^1, \ldots, s_N^l$ as well as the associated reduction-lookahead parameters $b^1, \ldots, b^l$ more efficient. While these parameters may be readily calculated by fully computing the round brackets of the defining equation for the updated intermediate result Z' in the case of l=2, this calculation is still redundant since obviously not all bits of the sum in the round brackets are required for calculating the reduction shift value $s_N^2$, but since only some most significant bits of this sum are required.

To simplify the calculation of the brackets and/or the most significant bits of the brackets, multiplicand C in the brackets may initially be neglected for calculating $s_N^2$. It is therefore not multiplicand C, which is static during the entire calculation and is not shifted upwards or downwards, that is decisive for the most significant bit of the brackets. Thus, for calculating $s_N^2$, the three-operands sum in the brackets already becomes a two-operands sum.

In addition, it is recommendable to introduce an auxiliary reduction shift value $s_i$ for calculating the reduction shift values $s_N^1, \ldots, s_N^l$. Using the following FIGS. 3a to 3c, reference will be made to calculating the auxiliary shift value $s_i$ to represent the calculation of the reduction shift value $s_N$ using the auxiliary reduction shift value $s_i$. An intermediate result Z and a modulus N are represented in FIG. 3a. By way of example only, the intermediate result has four bits, whereas the modulus has 9 bits. It shall be assumed that in block 920 of FIG. 8, a shifted intermediate result Z is calculated, which may be achieved by multiplying by $2^{s_Z}$.

For example, it shall be assumed that the multiplier comprised 8 zeros, which results in the multiplication shift value $s_Z$ to have been 8. To achieve a modular reduction, modulus N must attain the order of magnitude of the shifted intermediate result Z'. In accordance with the invention, modulus N is to be shifted sufficiently for the top bit of the shifted intermediate result Z' and the top bit of the shifted modulus N to be equal. As may be seen from FIG. 3b, a reduction shift value of $s_N=3$ is required for this purpose.

Figure 3B:
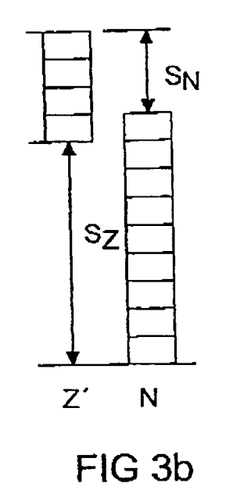

It can also be seen from FIG. 3b that $s_N$ may not actually be determined until $s_Z$ has been calculated, i.e. that it is not possible to perform blocks 910 and 930 of FIG. 8 in parallel, as is preferred for the present invention. For this reason, the auxiliary shift parameter $s_i$ is introduced. What it is advantageous about $s_i$ is that this value may be calculated without knowing the $s_Z$ of the current step.

Figure 3C:
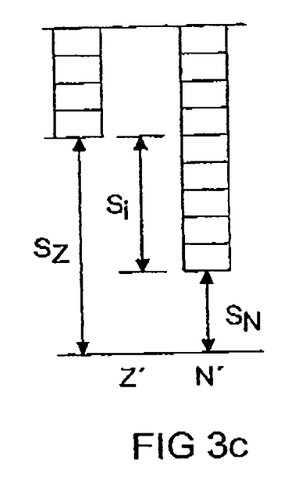

It may be seen from FIG. 3c that $s_Z$ always equals the sum of $s_i$ and $s_N$. Thus, $s_N$ is always associated with $s_Z$ and $s_i$ such that following equation applies:

$$s_N = s_Z - s_i.$$

The time-consuming iterative method for determining $s_N$ may thus be broken down into a time-consuming iterative method for determining $s_i$ (blocks 930, 940) and into a fast difference operation $(s_N = s_Z - s_i)$. Thus, it is possible to perform the two lookahead methods nearly in parallel, the only serial component being that, prior to calculating $s_N$, the actual value of $s_Z$ has already been calculated and provided by the multiplication-lookahead algorithm.

As has already been explained, the calculation of the brackets and/or the calculation of $s_N^2$ may be simplified further by introducing a modulus transformation. As will be explained below, by means of the modulus transformation, the time-consuming ZDN comparison for calculating the auxiliary shift value $s_i$ is greatly simplified, the defining equation for $s_i$ being as follows:

$$\tfrac{2}{3} \, 2^{(-s_i)} N < |Z| \leq \tfrac{2}{3} \, 2^{(-s_i)} N$$

Figure 4:
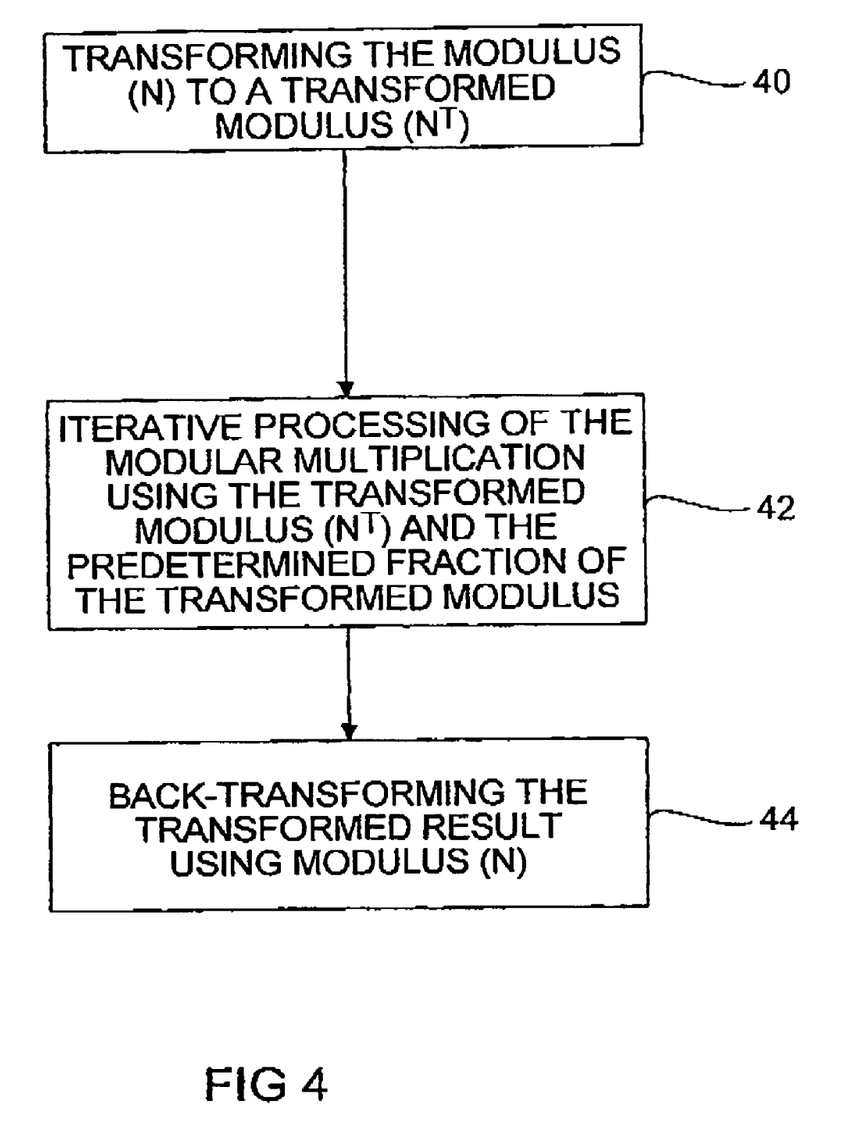
FIG. 4 depicts a flow chart for modular multiplication with a modulus transformation.

FIG. 4 shows a flow chart of the inventive method for modular multiplication of a multiplicand C by a multiplier M using a modulus N. In a step 40, modulus N is initially transformed into a transformed modulus $N^T$ in accordance with the following equation:

$$N^T = T \times N.$$

In a step 42, the modular multiplication is then processed using the transformed modulus $N^T$ and the predetermined fraction of the transformed modulus, which is ⅔ in the preferred embodiment. In relation to the modular exponentiation this means that an RSA equation is calculated which takes on the following form:

$$C^T := M^d \bmod N^T.$$

Thus, the result of the modular exponentiation C is not calculated in the residual class defined by modulus N, but in the residual class defined by the transformed modulus $N^T$, which is why the left-hand side of the above equation features $C^T$ rather than C. The inventive concept is characterized by the fact that the use of the transformed modulus $N^T$ greatly simplifies the calculation of the auxiliary reduction shift value $s_i$ which corresponds to the iteration loop of FIG. 9 of the prior art reduction-lookahead method.

In a final step 44, a transformation of $N^T$ back to N is performed by conducting an operation corresponding to the following equation:

$$C := C^T \bmod N.$$

The transformed result $C^T$, which is located in the residual class of the transformed modulus $N^T$, is preferably led back to the residual class of modulus N by a simple shift/subtraction reduction, so that C is the result of the modular exponentiation.

The transformation of modulus N into a transformed modulus $N^T$ using the transformer T of step 10 is conducted such that the predetermined fraction of the transformed modulus, i.e. the, ⅔-fold of the transformed modulus in the preferred embodiment, has a more significant digit having a first predetermined value, which digit is followed by at least one less significant digit having a second predetermined value. Thus, the comparison of the intermediate result Z with the ⅔-fold of the transformed modulus may be greatly simplified, specifically by searching for the top digit of Z, which also comprises the first predetermined value, wherein the difference between the more significant digit having a first predetermined value of the predetermined fraction of the transformed modulus, and the top digit of the intermediate result Z having the first predetermined value equals the difference $S_i$.

In summary, this may be represented as follows. N is preferably transformed into a transformed modulus $N^T$ in the 32-bits CPU rather than in the cryptocoprocessor, so that $$N^T := T \times N,$$

wherein T is a natural number.

If all numbers used are binary numbers, $N^T$ takes on the following form:

$$N^T = 1100 \ldots 0 \, XX \ldots XX$$

The ⅔-fold of the transformed modulus then takes on the following value:

$$\tfrac{2}{3} \, N^T = 100 \ldots 0 X'X' \ldots X'X'$$

It can be seen from $N^T$ and ⅔ $N^T$ that both have a first portion of, for example, 16 bits, and, after that, a portion of L(N) bits X and/or X'. Only the top 16 bits of the ⅔-fold of the transformed modulus $N^T$ are utilized for the so-called ZDN comparison, since this already leads to an error probability which is better than about $2^{-10}$. Thus, not all 512, 1024 or 2048 bits of the ⅔-fold of the transformed modulus must be utilized for a ZDN comparison, but it is sufficient for this comparison to be performed with the top 16 bits of the transformed modulus. Of course it would also be possible to utilize even fewer bits of ⅔ $N^T$ for a comparison, but then the error probability would gradually increase. However, since the errors are not critical and only lead to a suboptimal behavior of the reduction-lookahead method, this road may readily be taken.

Thus, the ⅔-fold of the transformed modulus $N^T$ has a more significant digit having the value 1, which is followed by at least one less significant digit having a value of 0, i.e. a second predetermined value. In the above-described embodiment, the number of the less significant digits is 15. Of course, it will also be possible to use larger or smaller blocks here, depending on the differences in sizes between the intermediate result Z and the ⅔-fold of the transformed modulus $N^T$ that are to be expected and/or processed. The amount of the intermediate result Z of the modular multiplication, i.e. of the result of the three-operands addition in block 950 of FIG. 8, takes on the following form:

|Z|00 . . . 01YY . . . Y

The auxiliary shift value $s_i$ is calculated in accordance with the following equation:

⅔ $N^T \times 2^{-si} < |Z| \le$ ⅘ $N^T \times 2^{-si}$.

Due to the topology of the ⅔-fold of the transformed modulus $N^T$, the value $s_i$ will always be the distance between the most significant bit, having a 1 of the ⅔-fold of the transformed modulus $N^T$, and the most significant 1 of the amount of the intermediate result.

In accordance with the invention, this difference in terms of digits and/or the value $s_i$ may be determined in a trivial manner. No more iteration will be required.

In addition, no more ZDN register will be necessary for storing the ⅔-fold of the modulus, since, per definition, at least the top, e.g. 16, bits of the ⅔-fold of the transformed modulus $N^T$ will always have the same form. No more bit comparator will be required.

Due to the fact that no ZDN register and no ZDN comparator are required, the entire calculating unit is to be accommodated on a smaller chip area.

Figure 9:
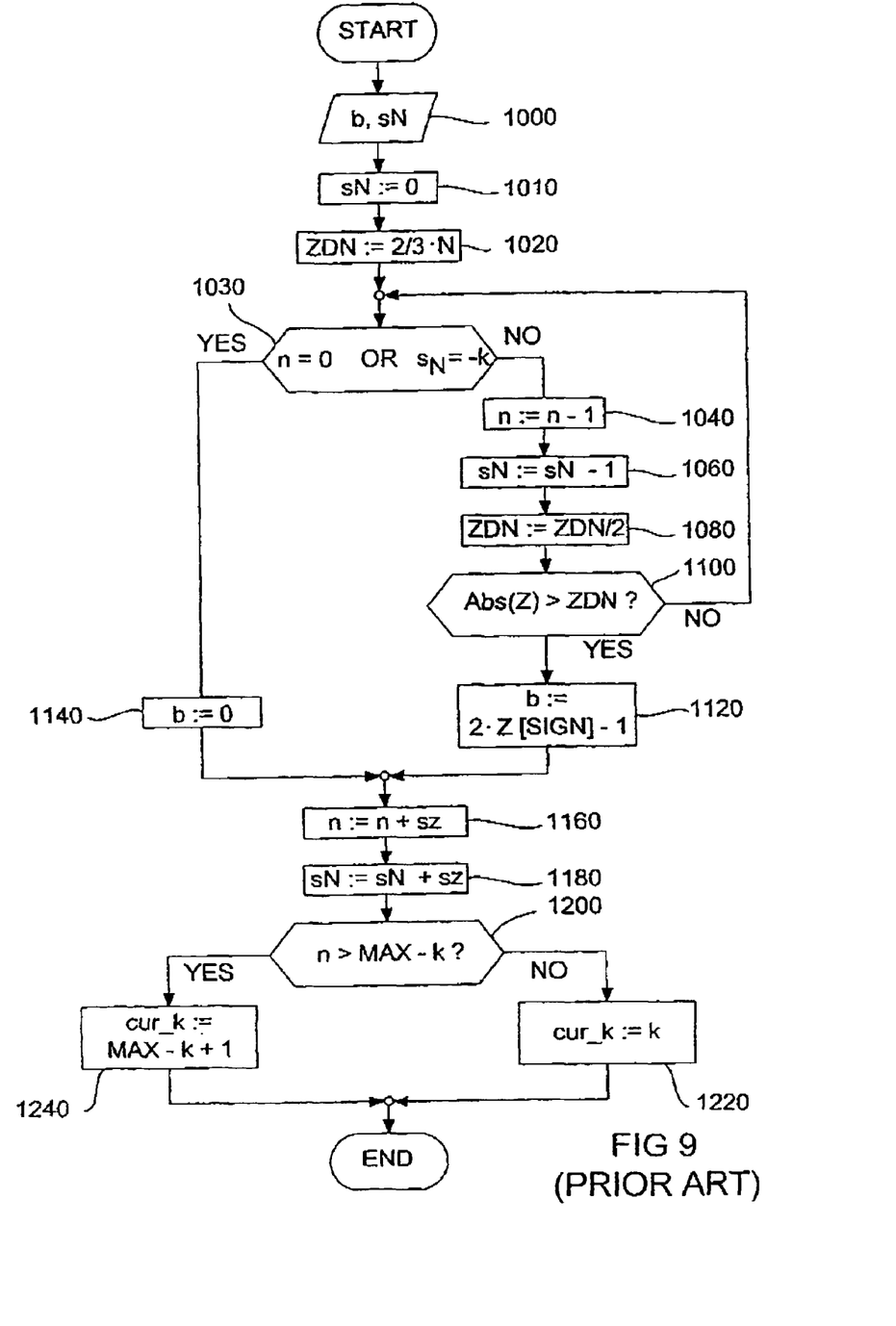
FIG. 9 is a flow-chart representation of the prior art reduction-lookahead method.

In addition, the crypto-control part, i.e. the control logic for the ZDN comparison, is less complex, since the time-consuming iteration loop of FIG. 9 need not be performed. Lastly, the calculation is performed faster, so that no more timing problems result for the entire algorithm due to the calculation of the auxiliary shift value $s_i$.

Figure 5:
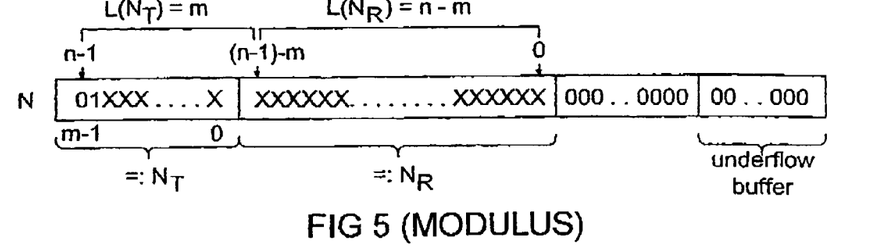
FIG. 5 depicts a sub-division of a modulus N into a first section $N_T$ of bits and into a second section $N_R$ of bits.
Figure 6:
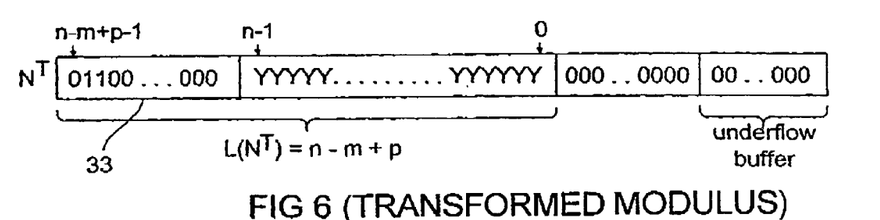
FIG. 6 shows the sub-division of the transformed modulus $N^T$ into a first section of digits of the length L, and into the remaining digits.
Figure 7:
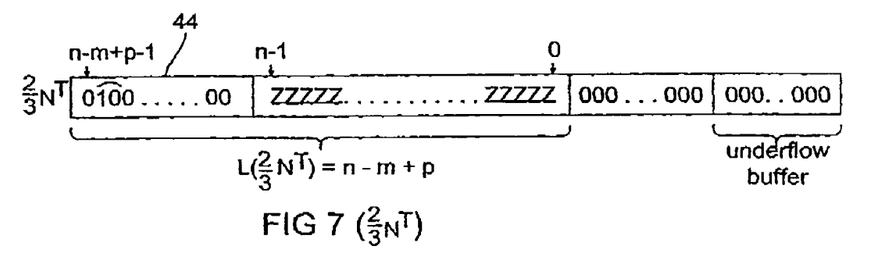
FIG. 7 is a representation of the digits of the ⅔-fold of the transformed modulus $N^T$.

The inventive transformation will be referred to in more detail with reference to FIGS. 5 to 7.

As has already been explained, a substantial part of the ZDN algorithm consists in that the following equation be met:

⅔ $2^{-si} N < |Z| \le$ ⅘ $2^{si} N$.

$s_i$ is referred to as the auxiliary shift value and is that shift value which is required for shifting Z, in terms of digits, to the same position as N. In the prior art, comparison operations of |Z| with ⅔ N have been necessary for calculating $s_i$.

In accordance with the invention, the comparison with ⅔ is simplified by transforming the modulus into the transformed modulus $N^T$, the transformed modulus $N^T$ being larger than N, prior to performing any modular operation with N. Subsequently, all calculations modulo $N^T$ are performed. However, since the result of the calculation must be N in the residual class, a final reduction with N is performed according to the invention.

As is shown in FIG. 5, let N be an integer with a length of N bits. Since the modulus N is always a positive integer, i.e. MSB=0 in the two-complements representation, the sign bit always equals 0, and the second but most significant bit (MSB−1) of modulus N always equals 1. For the ZDN comparison it is not necessary to compare all bits of the modulus with all bits of the intermediate result, but it is sufficient to use a number of m bits for the ZDN comparison. The most significant m bits of modulus N define a first part of modulus $N_T$, whereas the remaining N−m bits of the modulus define a second part $N_R$ of the modulus. In a preferred embodiment, m equals 16. Of course, higher or smaller values of m are also possible.

As is shown in FIG. 6, the transformation is performed such that the transformed modulus $N^T$ is 16 bits longer than the original modulus of FIG. 2.

For the ZDN comparison it is sufficient to use the first 16 bits of $N^T$, only 12 bits being used for comparison in a preferred embodiment of the present invention, whereas the 4 least significant bits represent a buffer for potential carry-overs that may still be to come from less significant bits.

In this case, the probability that the comparison yields an incorrect result is smaller than $2^{-12}$. If the comparison provides an incorrect result, only a suboptimal reduction shift value $s_N$ is produced, but the result modulo N is still correct.

If the modulus is used in the two-complements representation, as in FIG. 5, modulus N may be broken down as follows:

$N = 2^{n-m} N_T + N_R$.

N is now transformed into $N^T$ using the transformer T, T being a suitably selected integer, which is a must for reasons of congruency. $N^T$ should take on the form shown in FIG. 6, i.e. the most significant bit (MSB) of $N^T$ must equal 0, since $N^T$ is to be a positive integer. As will be explained below, the second but most significant bit and the third but most significant bit of the transformed modulus must equal 1, whereas all other bits of the top portion of the transformed modulus $N^T$, which portion is referred to by reference numeral 33 and FIG. 6, should have a value of "0". Only in this case will it occur for the ⅔-fold of $N^T$ that the top portion of the ⅔-fold of $N^T$, as is shown in FIG. 7, merely has one bit having a "1", whereas all other bits in this top portion 44 equal "0", so that the above-described trivial comparison for determining $s_i$ may be performed.

Initially, however, reference will be made, with respect to FIG. 6, to the calculation of the transformed modulus $N^T$ using the transformer T. The following definition shall apply:

$$N^T = TN$$

$$= T(2^{n-m} N_T + N_R)$$

The following applies to transformer T:

$$T = \left| \frac{2^{p-2} + 2^{p-3}}{N_T} \right|$$

Thus, the following results for the transformed modulus $N^T$:

$$T = \left|\frac{2^{p-2}+2^{p-3}}{N_T}\right|(2^{n-m}N_T+N_R)$$

$$N^T = (2^{n+p-m-2}+2^{n+p-m-3})\frac{N_T}{N^T}+(2^{p-2}+2^{p-3})\frac{N_R}{N_T}.$$

If, for example, typical values are taken on for p and m, i.e. p=32 bits and m=16 bits, the following results for $N^T$:

$$N^T = 2^{n+14}+2^{n+13}+N_R\frac{2^{p-2}+2^{p-3}}{N_T}.$$

It shall be pointed out that the calculation of $N^T$ is preferably performed in the host CPU rather than in the cryptocoprocessor. The host CPU includes a short-number calculating unit, which, however, is sufficient for calculating $N^T$. Since T must be an integer and since the calculations are performed within the cryptocoprocessor modulo $N^T$ instead of modulo N, $N^T$ being larger than N, it is only the first p-m equaling 16 bits of $N^T$ that are relevant for the trivial ZDN comparison for calculating the auxiliary shift value $s_i$. The other n bits of $N^T$ may be any numbers, they are not relevant for calculating the auxiliary shift value $s_i$, i.e. for the comparison with Z. Evidently, however, all bits of the transformed modulus $N^T$ will be required for the three-operands addition, which is now performed using the shifted transformed modulus rather than using the shifted modulus.

For the values selected for m and p, the transformer T is a 16-bits integer. Therefore, the division required for calculating T, and/or which is required for calculating $N^T$, need only be performed for the most significant 32 bits and may therefore be programmed in a fast and simple manner on the host CPU.

FIG. 7 shows the ⅔-fold of the transformed modulus $N^T$. Since the MSB−1 and the MSB−2 of $N^T$ equal "1", as is shown in FIG. 6, and the following applies:

$(11)_2=(3)_{10}$ and $(⅔\times3)_2=(2)_{10}=(10)_2$, a simple bit pattern results for the ⅔-fold of the transformed modulus $N^T$, the length of ⅔-fold of the transformed modulus $N^T$ equaling n−m+p.

Due to the special form of ⅔ $N^T$, the comparison with |Z| becomes very simple. It is known that the most significant one of ⅔ $N^T$ at a position n+p−m−2 is at the beginning of a modular operation. A pointer for register Z then starts, in a preferred embodiment, at the MSB of Z and searches for the first "1" of Z. If the MSB of Z equals 1, Z is a negative number, and the first zero of Z is searched for instead.

The difference in the bit position of the first one in register N and in register Z determines the auxiliary shift value $s_i$.

Since the result of the modulo operation must be N in the residual class, a final reduction modulo N is performed in accordance with the invention, i.e. a backtransformation (step 44 in FIG. 4) must be performed.

Compared to the prior art ZDN comparison, the transformation of N to $N^T$ has the following advantages:

Instead of calculating ⅔ N within the cryptocoprocessor, a simple transformation of N to $N^T$ may be performed in the host CPU.

No ZDN register and no comparator logic are required on the chip, which is why the chip area and the complexity of the coprocessor become smaller.

The use of the modulus transformation enables, in a simple manner, the calculation of the auxiliary shift value $s_i$ without having to calculate the entire content of the bracket and/or the brackets in the defining equations for the updated intermediate result Z'.

Thus, the individual steps for performing the inventive methods in accordance with a preferred embodiment of the present invention with respect to the example l=2 are as follows:

1. Performing a modulus transformation.
2. Calculating the multiplication shift values $s_Z^1$ and $s_Z^2$ as well as the multiplication-lookahead parameters $a^1$ and $a^2$.
3. Calculating the auxiliary shift value $s_i^1$ and calculating the first reduction shift value $s_N^1=s_Z^1-s_i^1$, and determining the first reduction-lookahead parameter $b^1$.
4. Calculating the content of an auxiliary intermediate result corresponding to the above-mentioned bracket without taking into account the multiplicand, so as to calculate therefrom, using the modulus-register content shifted by $s_N^1$, the second auxiliary shift value $s_i^2$ from which, then again, the reduction shift parameter $s_N^2$ may be calculated.
5. Performing the five-operands addition with the values for C, N and/or $N^T$ and Z to which the shift values and the shift parameters have been applied.
6. Iterating the above-mentioned steps until all digits of the multiplier have been processed.
7. Performing a modulus backtransformation.

Lastly, it shall be pointed out that the inventive concept of the multi-operands adder for calculating several conventional ZDN steps at the same time may also be used for rings of the shape $f_2[x/N(x)]$ (N(x) being a d-degree polynomial) wherein all quantities are then to be seen as polynomials of a variable x, and wherein the coefficients of the individual powers of x are to be stored in the appropriate registers.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A method for performing a modular multiplication on data processing means between a multiplicand and a multiplier consisting of a plurality of digits, using a modulus, the modular multiplication being part of a modular exponentiation within the framework of a cryptographic application, and the multiplicand, the multiplier and the modulus being variables of the cryptographic application, the method comprising:

determining l multiplication shift values by means of a multiplication-lookahead method while taking into account l blocks of consecutive digits of the multiplier, l being equal to or larger than 2;

determining l reduction shift values by means of a reduction-lookahead method for the l blocks of digits of the multiplier;

applying the l multiplication shift values and the l reduction shift values to an intermediate result from a previous iteration step, to the modulus or to a value derived from the modulus, and to the multiplicand so as to obtain 2l+1 operands; and combining the operands to obtain an updated intermediate result for an iteration step following the previous iteration step, an iteration being continued for such time until all digits of the multiplier have been processed, wherein the updated intermediate result, once all digits of the multiplier have been processed, is a result of the modular exponentiation within the framework of the cryptographic application.

2. The method as claimed in claim 1, wherein the step of determining l multiplication shift values further includes determining l multiplication-lookahead parameters;

the step of determining l reduction shift values further includes determining l reduction-lookahead parameters; and the step of applying includes using the l multiplication-lookahead parameters and the l reduction-lookahead parameters to obtain the 2l+1 operands.

3. The method as claimed in claim 1, wherein the step of determining the l reduction shift values includes performing the following substeps:

determining an auxiliary shift value from an intermediate result and from a modulus value for a preceding iteration step;

forming a difference from the multiplication shift value for a first number of digits of the multiplier, and the auxiliary shift value so as to obtain a reduction shift value.

4. The method as claimed in claim 3, wherein the step of determining l reduction shift values further includes the following substeps:

calculating an auxiliary intermediate result using the intermediate result for the preceding iteration step, calculating the first multiplication shift value, the modulus and the reduction shift value, however without taking into account the multiplicand;

calculating an auxiliary modulus by shifting the modulus or the value derived from the modulus by a number of digits equaling the reduction shift value;

calculating a further auxiliary shift value from the auxiliary intermediate result and the auxiliary modulus; and forming a difference from the second multiplication shift value and the second auxiliary shift value so as to obtain the second reduction shift value.

5. The method as claimed in claim 1, wherein prior to the step of determining l multiplication shift values, and prior to the step of determining l reduction shift values, the following step is performed:

transforming the modulus to a transformed modulus larger than the modulus, a predetermined fraction (⅔) of the transformed modulus having a more significant digit having a first predetermined value, which digit is followed by a less significant digit having a second predetermined value;

and wherein the following step is performed once all digits of the multiplier have been processed:

transforming the updated intermediate result back by modular reduction of the updated intermediate result using the modulus, the steps of determining, of applying and of combining being performed on the basis of the transformed modulus.

6. The method as claimed in claim 5, wherein the step of determining l reduction shift values includes a substep of determining a multiplication intermediate result and a reduction shift value, the reduction shift value being calculated using a determination of the number of digits between the more significant digit having the first predetermined value of the transformed modulus, and the most significant digit of the intermediate result having the first predetermined value.

7. The method as claimed in claim 5, wherein the predetermined fraction of the modulus is ⅔.

8. The method as claimed in claim 5, wherein the most significant bit of the transformed modulus is a sign bit, and wherein a more significant portion of the predetermined fraction of the modulus is as follows:

01000 xx . . . xx, wherein the bits designated by xx may have any values.

9. The method as claimed in claim 8, wherein the more significant portion of the transformed modulus is as follows:

01100. . . 00.

10. The method as claimed in claim 1, wherein the modulus is an integer, or wherein the modulus is a polynomial of a variable.

11. An apparatus for performing a modular multiplication on data processing means between a multiplicand and a multiplier consisting of a plurality of digits, using a modulus, the modular multiplication being part of a modular exponentiation within the framework of a cryptographic application, and the multiplicand, the multiplier and the modulus being variables of the cryptographic application, the apparatus comprising:

means for determining l multiplication shift values by means of a multiplication-lookahead method while taking into account l blocks of consecutive digits of the multiplier, l being equal to or larger than 2;

means for determining l reduction shift values by means of a reduction-lookahead method for the l blocks of digits of the multiplier;

means for applying the l multiplication shift values and the l reduction shift values to an intermediate result from a previous iteration step, to the modulus or to a value derived from the modulus, and to the multiplicand so as to obtain 2l+1 operands; and means for combining the operands to obtain an updated intermediate result for an iteration step following the previous iteration step, an iteration being continued for such time until all digits of the multiplier have been processed, wherein the updated intermediate result, once all digits of the multiplier have been processed, is a result of the modular exponentiation within the framework of the cryptographic application.

* * * * *